United States Patent Office 3,113,035
Patented Dec. 3, 1963

3,113,035
METAL PLATING PROCEDURE

Henry E. MacCormack, San Jose, Calif., assignor to International Business Machines Corporation, New York, N.Y., a corporation of New York No Drawing. Filed May 26, 1960, Ser. No. 31,805
5 Claims. (Cl. 117—50)

Applicant's invention relates to a metal plating process, and more particularly, to a treatment of a metal object to be plated with a polyhalo lower alkane prior to plating said object.

In a random access storage system of the 305 Ramac ® type, magnetic discs are stacked, one above the other, spun at a speed of about 1200 r.p.m., and read by a recording head which is moved from disc to disc and from area to area on a disc at relatively high speeds in response to commands from an operator.

In machines of this type, the recording head floats about 25 microns above a disc surface on an air bearing created by blowing compressed air through the recording head onto the disc surface. In spite of considerable care on the part of designers, the "flying" head still sometimes "crashes" into the spinning disc due to disc irregularities and other causes. This bombardment of the disc by the recording head causes further roughness in the disc surface, loss of magnetic character, and finally, the disc must be discarded.

In later random access storage systems, the recording head flies about 2.5 to about 5.0 microns above a disc which rotates at about 1800 r.p.m. The compressed air cushion used in these machines is created by the relative motion between the disc and the recording head. Impact problems are materially increased in these machines, especially since the magnetic plate covering the disc is only from about 2.5 to about 12.5 microns thick. Even small "hills" and "valleys" change the configuration of the air gap between the recording head and the disc causing the recording head to crash into the disc.

In an effort to create a surface of desired smoothness, impact resistance, hardness and magnetic characteristics for use in the later random access storage systems, applicant and his co-workers studied known coatings and types of platings and decided that an electroless plating was probably the best surface for their purposes. However, there were serious problems of adhesion and surface smoothness inherent in producing useful electroless platings. Etched or otherwise roughened surfaces are thought to be necessary for good plate adhesion, yet when applicant plated rough substrate surfaces, the plate surface was too rough for his purposes. Adhesion was poor if smooth substrate surfaces formed by prior art processes were plated.

Applicant first attempted to modify existing plating and polishing procedures to obtain better results with little success. Commercial sources were of little help as they had not previously attempted to form magnetic platings having the desired smoothness and adhesion and capable of being hardened sufficiently to withstand recording head impact. Applicant next attempted to modify known metal pre-treatment procedures to obtain smooth base metal surfaces on which to plate. Various buffing, grinding and etching procedures were tried and discarded. Plate smoothness and adhesion remained almost insurmountable problems.

In the normal plating procedure, an object to be plated is pickled to remove oxide scale; buffed and polished to a mirror finish to remove physical imperfections; cleaned with an organic liquid or an akaline cleaner to remove oil, grease and polishing compounds; acid dipped and finally plated. Two representative books which contain descriptions of pickling baths, alkaline and acid baths, and buffing and polishing procedures are:

"Finishing Handbook and Dictionary," pages 27–60 et. seq., Sawell Publishers, Ltd., London, 1954, et. seq.

"Metal Finishing Guidebook Directory," pages 183–194, Finishing Publications, Inc., Westwood, New Jersey, 1955.

While experimenting with procedures which seemed to hold the least promise of process improvement, applicant discovered that adhesion could be improved greatly by modifying the currently used vapor degreasing procedures. In applicant's process, a metal object to be plated having a mirror-like finish is soaked in a cold polyhalo lower alkane bath from about 2 to about 40 hours, preferably from about 8 to about 24 hours, and still more preferably, from about 14 to about 18 hours. In instances where the object being prepared for plating is iron or an iron alloy, it is preferable to soak the object no more than about 24 hours as, contrary to prior thought (see "Solvent Degreasing," W. L. McCraken, Iron and Steel Engineer, August 1957, pages 1–8), there is an apparent chemical attack on the object as is evidenced by etching and pitting.

Applicant's pretreatment step is useful in pretreating, i.e., cleaning, all of the metals normally electroplated and electroless plated. Applicant prefers to treat iron, aluminum, magnesium, copper, and alloys of these metals by his preplating treatment. While any metal can be utilized as a plating material for surfaces pretreated by applicant's process, applicant prefers to use as plating materials, nickel-phosphorous alloys, nickel-cobalt alloys, nickel, cobalt and copper.

Polyhalo lower alkanes which can be used include polyhalo alkanes having no more than three carbon atoms; e.g., methylene chloride, trichloroethylene, dichloroethylene, perchloroethylene, propylenedichloride, bromotrichloromethane, dichlorodifluoromethane and other chlorofluoro hydrocarbons, such as the Freons. Trichloroethylene and perchloroethylene are preferred solvents. The temperature of the baths should be sufficiently low to maintain the low boiling polyhalo lower alkanes, such as Freons, in the liquid state and need not be above about 32° C. in any event. Preferably, the object should be soaked at ambient room temperature. Contrary to prior belief, applicant has found that no vapor treatment is needed after the cold soak is completed.

By way of example, applicant will discuss his invention in light of a specific process for plating a ferrous alloy object and a non-ferrous metal object. Applicant does not wish to be restricted to the exact objects, solvents, inhibitors and soaps set out. Rather, applicant intends to include within the scope of his claims all equivalents obvious to those skilled in the art.

*Example 1.*—To plate a circular aluminum disc from commercial ruled stock (Alcoa; SAE 2S) having a substantially mirror-like finish, the disc is placed in a tank of trichloroethylene maintained at ambient room temperature, about 20° C., for about 16 hours; air dried; and is placed in an alkaline bath (Pennsalt 827, a mild caustic solution containing a detergent and inhibitors) having a pH of about 8 at 71° C. for about one hour. The disc is then rinsed and dipped in an inhibited acid bath [Conc. $H_2SO_4$: Conc. $H_3PO_4$: $H_2O$ in a 1:2:3 ratio by volume] for one to two minutes and rinsed. The aluminum disc is then plated in an electroless plating bath and plated at about 19 to 21 microns per hour to a thickness of about 12.5 microns.

*Example 2.*—To plate an SAE 1008 grade steel alloy disc, the mirror-like disc is soaked overnight in a perchloroethylene bath; air dried; dipped in an alkali solution having a temperature of about 82° to about 98° C. through which is passed six volts at about 70 to 100 amps. ft.$^2$. The current is reversed periodically for two minutes, the surface rinsed in water and plated as in Example 1.

Now, having described my invention, I claim:

1. In a process for plating a metal object to a mirror finish, the step of contacting said metal object with a cold polyhalo lower alkane selected from the group consisting of trichloroethylene and perchloroethylene for a period of from about 14 to about 18 hours prior to plating said object, said object being comprised of a metal selected from the group consisting of iron, aluminum, magnesium, copper, and their alloys.

2. A process for electroless plating a ferrous metal surface to a specular, mirror-like finish, said process comprising:

contacting said ferrous metal surface with a polyhalo alkane selected from the group consisting of trichloroethylene and perchloroethylene for a period of about 14 to about 18 hours;

contacting the surface with an alkali bath having a pH of about 8 and a temperature of about 82° to about 98° C. while impressing a 6-volt potential across said alkali solution at about 70 to 100 amps. and periodically reversing the current flow;

rinsing the surface with water; and contacting the surface with an electroless plating bath adapted to plate a composition of about 93% nickel and 7% phosphorous at about 19 to 21 microns per hour until said specular finish is obtained at the thickness desired.

3. A process for the plating of a specular finish upon an aluminum surface comprising:

contacting said surface with a lower polyhalo alkane selected from the group consisting of trichloroethylene and perchloroethylene for a period of about 14 to about 18 hours;

contacting said surface with an alkali solution at a pH of about 8 for one hour at about 70° C.;

contacting the surface with an inbihited acid bath for a few minutes;

contacting said surface with a rinse water; and immersing said surface in an electroless plating bath, said bath being adapted to plate a composition of about 93% nickel and 7% phosphorus at about 19 to 21 microns per hour, until a desired plate thickness is obtained.

4. In a method for pre-cleaning a substrate of the ferrous-aluminum type for subsequent plating thereon of magnetic material to a spectrally-smooth finish, said method comprising soaking said substrate in a bath containing a polyhalo lower alkane type material such as trichloroethylene or perchloroethylene at room temperature, the improvement consisting of:

precleaning said substrate in a single unitary cleaning-immersion step, said step comprising immersing said substrate in said bath for a period of at least about 16 hours so as to degrease the substrate sufficently to provide a smooth base for subsequent plating to a spectral-smoothness without need of any plural cleaning-immersions.

5. The method as recited in claim 4 wherein said substrate is of the ferrous type and wherein said period involves a maximum of 24 hours so as to prevent deterioration of the surface of said ferrous substrate.

References Cited in the file of this patent

UNITED STATES PATENTS

| | | |
|---|---|---|
| 2,371,646 | Petering et al. | Mar. 20, 1945 |
| 2,836,510 | Bolin | May 27, 1958 |
| 2,959,494 | Shepard | Nov. 8, 1960 |
| 3,021,235 | Schumacher | Feb. 13 1962 |